United States Patent [19]
Rogers et al.

[11] Patent Number: 5,895,589
[45] Date of Patent: Apr. 20, 1999

[54] APPARATUS, INCLUDING A DIODE LASER ARRAY, FOR REMOVING AUTOMOBILE WINDSHIELDS

[75] Inventors: Lesley Rogers, Tucson; Thomas Carr Dearmin, Oro Valley, both of Ariz.

[73] Assignee: Opto Power Corporation, Tucson, Ariz.

[21] Appl. No.: 08/964,074

[22] Filed: Nov. 4, 1997

Related U.S. Application Data

[63] Continuation-in-part of application No. 08/655,744, May 30, 1996, abandoned.

[51] Int. Cl.$^6$ .................................................. B23K 26/08
[52] U.S. Cl. ........................... 219/121.76; 219/121.85; 156/344
[58] Field of Search .......................... 219/121.6, 121.61, 219/121.65, 121.68, 121.73, 121.75, 121.76, 121.77, 121.84, 121.85; 156/272.8, 344, 584; 427/554, 555, 596

[56] References Cited

U.S. PATENT DOCUMENTS

| | | | |
|---|---|---|---|
| 3,242,314 | 3/1966 | Eckles | 219/121.6 |
| 3,392,259 | 7/1968 | Meier | 219/121.6 |
| 3,464,534 | 9/1969 | Muncheryan | 219/121.61 |
| 4,635,415 | 1/1987 | Schumacher et al. | 156/344 |
| 4,743,091 | 5/1988 | Gelbart | 369/112 |
| 4,804,975 | 2/1989 | Yip | 347/237 |
| 4,808,789 | 2/1989 | Muncheryan | 219/121.6 |
| 5,269,868 | 12/1993 | Gofuku et al. | 156/344 |
| 5,272,716 | 12/1993 | Soltz et al. | 219/121.6 |
| 5,468,238 | 11/1995 | Mersch | 606/15 |
| 5,580,471 | 12/1996 | Fukumoto et al. | 219/121.61 |

FOREIGN PATENT DOCUMENTS 7-155978  6/1995  Japan .................. 219/121.75

*Primary Examiner*—Gregory L. Mills
*Attorney, Agent, or Firm*—Herbert M. Shapiro

[57] ABSTRACT

Damaged automobile windshields are removed using an array of laser diodes. The diodes are chosen to provide light energy at a wavelength to be focused on and absorbed by the ceramic layer coating the windshield edge and to which is bonded the adhesive layer which holds the windshield in place. In practice, the diode array is moved along the windshield edge directing light through the windshield at the ceramic layer. The laser array comprises a linear array of diodes, having a length to span the width of the adhesive band.

6 Claims, 3 Drawing Sheets

5,895,589

1

APPARATUS, INCLUDING A DIODE LASER ARRAY, FOR REMOVING AUTOMOBILE WINDSHIELDS

REFERENCE TO RELATED APPLICATIONS

This application is a continuation-in-part of patent application Ser. No. 08/655,744, field May 30, 1996 now abandoned for the applicant herein and assigned to the assignee of the present application.

FIELD OF THE INVENTION

This invention relates to apparatus and method for removing automobile windshields in preparation for installing replacement windows.

BACKGROUND OF THE INVENTION

It is well known that automobile windshields often become damaged over time by flying stones. Frequently, cracks occur in the windshields and, at times, windshields are shattered in accidents. In order to install replacement windshields, it is necessary to remove any remaining portions of the windshield still in place.

At present, a hot knife or wire is used to move between the glass remnants and the adhesive which holds the remnants in place. Although these procedures work, as is testified to by the millions of windshields replaced each year, the procedures are awkward to employ as well as time consuming and physically limiting.

BRIEF DESCRIPTION OF THE INVENTION

In accordance with the principles of this invention, a laser diode is positioned to direct a moving beam of light along the edge of the windshield through the glass where the windshield is fastened to the automobile body by a band of adhesive. The beam is focused to interact with the ceramic coating on the windshield to heat the adhesive to a form which no longer adheres to the glass of the windshield. In practice, the laser beam is formed by an array of lasers which spans the width of the ceramic strip while the beam is moved. The system permits the removal of a windshield in about 20 minutes.

2

DETAILED DESCRIPTION OF AN ILLUSTRATIVE EMBODIMENT OF THIS INVENTION

Figure 1:
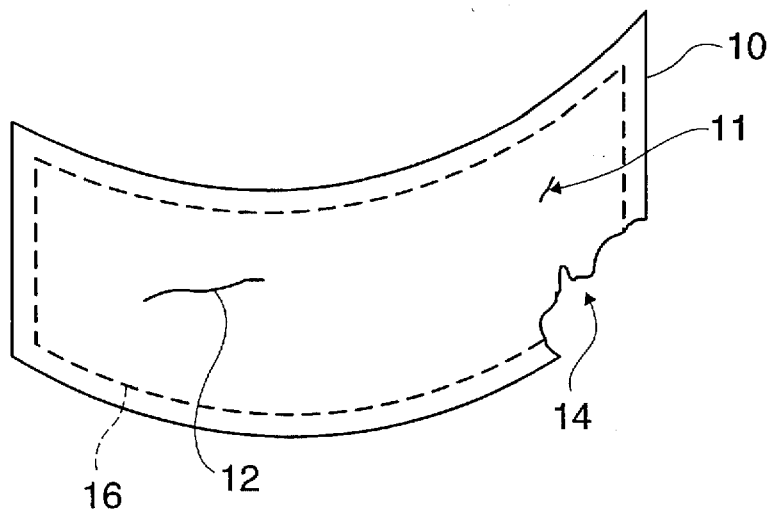
FIG. 1 is a schematic representation of an automobile windshield which has been damaged and in need of replacement.

FIG. 1 shows a windshield 10 which has been damaged as indicated by cracks 11 and 12 and by missing portion 14. The damaged windshield is secured to an automobile body by a band of adhesive indicated by broken line 16 around the periphery of the windshield. The adhesive commonly used to secure the windshield is a urethane rubber material which adheres to the ceramic layer at the edge of the windshield. In accordance with the principles of this invention, laser light energy is directed at the band of adhesive through the glass of the windshield along the periphery of the windshield and at the ceramic layer there. Light is focused on and is absorbed in the ceramic strip coating the windshield. The adhesive adheres to the ceramic and heating occurs transferring heat to the urethane interface. The adhesive layer, in response, is altered to a non-adhering form.

Figure 2:
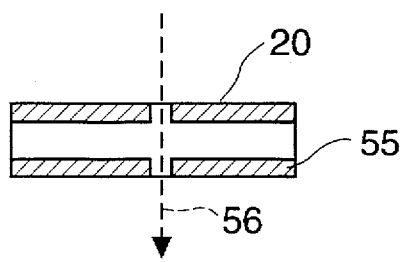
FIGS. 2 and 6 are schematic representations of linear arrays of diodes for supplying energy for removing the windshield of FIG. 1 from the window frame of an automobile to which it is secured.

The band of adhesive typically is about one half inch (16 mm wide and the laser energy is advantageously delivered to the ceramic strip to provide heat across the entire width of the adhesive simultaneously at the beam is moved along the edge of the windshield. Accordingly, in practice, a linear array of laser diodes is employed as indicated in FIG. 2. Specifically, FIG. 2 shows a linear array of diodes 20 which has a length to at least span the width of the adhesive band (16).

Figure 3:
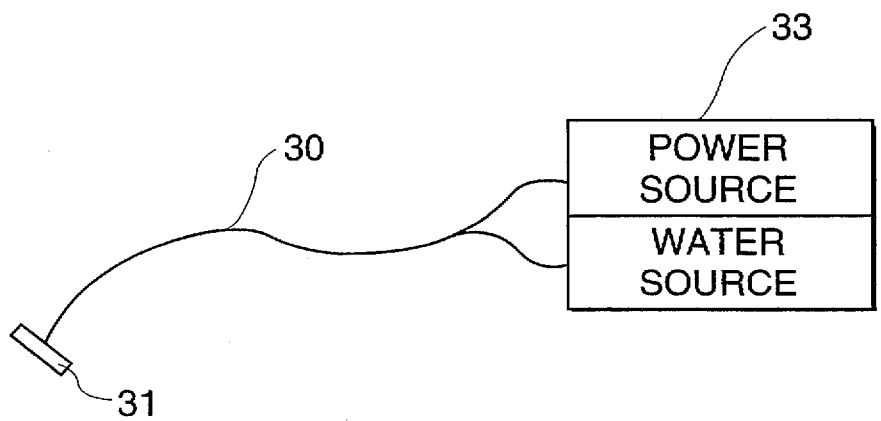
FIG. 3 is a schematic representation of apparatus for delivering light energy to the edge of the windshield of FIG. 1 for removing the windshield.

The array of diodes has to be brought to the windshield and moved along the entire periphery of the windshield. Accordingly, the diode array is conveniently arranged at the end of an umbilical cord which comprises water and electrical conduits designated 30 as shown in FIG. 3. The diode array is designated 31 in FIG. 3 and is shown at the left end of the conduit as seen in the figure. The right end of the conduit is shown connected to power and water sources represented by block 33. The power source can be sufficiently small to be attached and wheeled around by the operator for permitting a high degree of mobility which may be necessary to reach the entire windshield.

Figure 4:
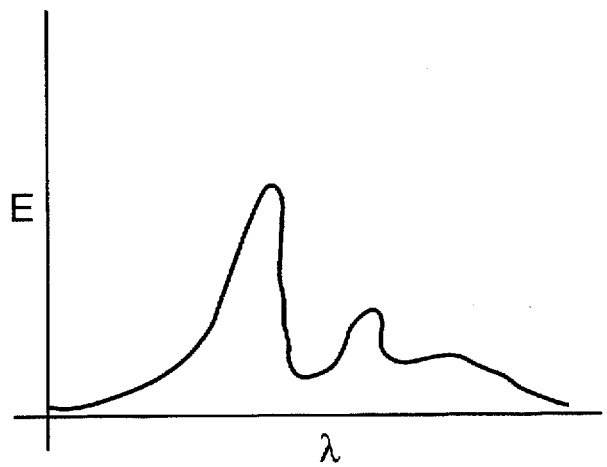
FIG. 4 is a plot of energy versus wavelength of the output of the laser array of FIG. 2.

For the typical adhesive employed for securing automobile windshields in place, laser light with a wavelength of 795–830 nm is employed. Light at that wavelength is absorbed by the ceramic layer which coats the edge of an automobile windshield and to which the adhesive layer is bonded. A linear array of 2×2 lasers moved at a rate of 10"/minute along the periphery of a windshield has been found to permit the removal of a windshield in about 20 minutes. FIG. 4 shows a plot of the energy output of a properly focused laser array of four lasers useful for this purpose. The output has a peak energy at 810 nm which is absorbed by the band of adhesive (16).

Figure 5:
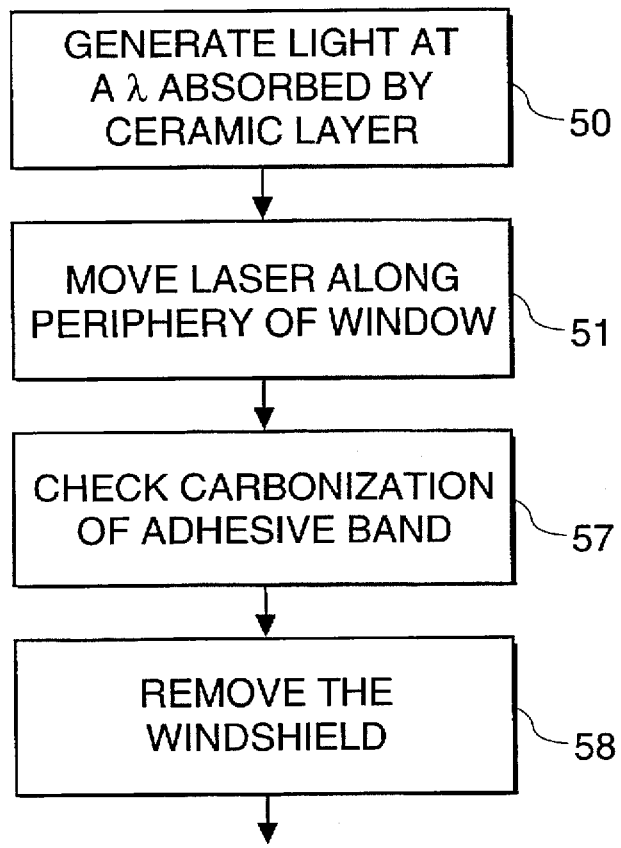
FIG. 5 is a flow diagram of the method of windshield removal in accordance with the principles of this invention.

FIG. 5 is a flow diagram of the method of windshield removal in accordance with the principles of this invention. The generation of light energy at a wavelength and at a power level which carbonized the adhesive is indicated by block 50 of FIG. 5. Typically, a laser having an output of 60 watts has been found sufficient to permit windshield removal in about 20 minutes.

The array of lasers, moved along the periphery of the windshield at a rate of about 10" per minute, has been found sufficient to permit carbonization of the adhesive as indicated by block 51 of FIG. 5. It may be advantage to preheat the ceramic and thus the adhesive prior to exposure to the energy output from laser array 20. Such preheating may be provided by a properly focused (also on the ceramic strip) second laser array designated 55 in FIG. 2 for movement of the array (31 of FIG. 3) in a direction indicated by broken arrow 56 of FIG. 2.

Prior to the removal of the windshield, inspection may be made to determine that all the adhesive has been altered. This step is indicated by block 57 of FIG. 5. If all the adhesive has been carbonized, the windshield is removed as indicated by block 58 of FIG. 5. This step is useful primarily during development and will be unnecessary in actual use.

Figure 6:
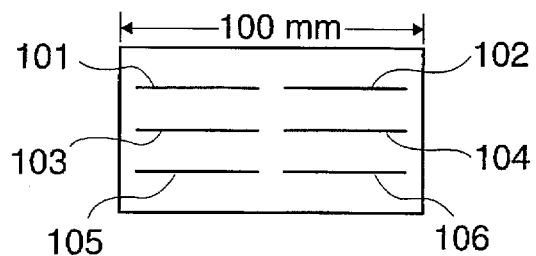

In one practical embodiment, a laser system, in accordance with the principles of this invention, include six one centimeter laser bars, arranged two by two as shown in FIG. 6, each bar including two laser diodes. The laser bars are designated 101, 102, 103, 104, 105, and 106 in FIG. 6 and in a prototype system spaced apart a distance off 2 nanometers.

Figure 7:
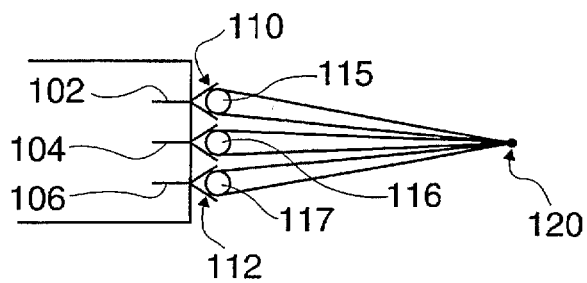
FIG. 7 is a schematic side view of an arrangement of diode arrays as shown in FIG. 6.

FIG. 7 shows a schematic side view of the system of FIG. 6. Each row of laser bars emits light represented by diverging lines 110, 111, and 112. Each row also has associated therewith a lens 115, 116, and 117 which focuses the emitted light to a point 120.

Figure 8:
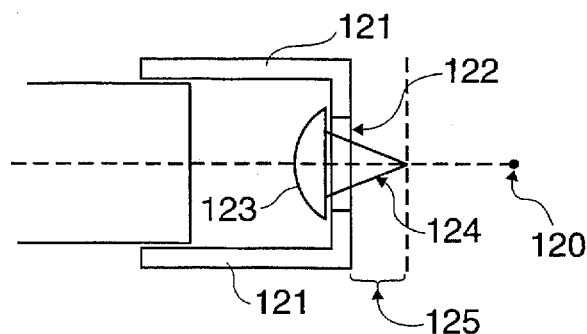
FIG. 8 is a schematic side view of a hand-held housing for the diode arrangement of FIGS. 6 and 7.

The system includes a housing 121 and a protective window 122 as shown in FIG. 8. A lens 123 is enclosed within the housing as shown to focus the emitted light at point 124 rather than at point 120 to provide a system working distance 125 equal to about the thickness of an automobile windshield, the position of the ceramic strip.

Figure 9:
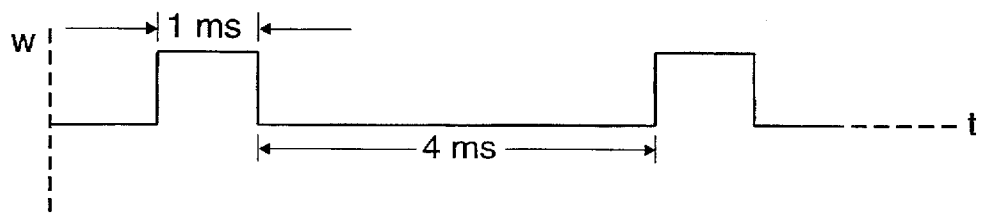
FIG. 9 is a pulse diagram for the operation of the system of FIGS. 6, 7, and 8.

The system lasers are pulsed at a 20 percent duty cycle, illustratively one millisecond on and four milliseconds off at 600 w peak power as indicated in FIG. 9 at 915 nm which allows a travel of 12–24 inches per minute allowing six minutes for a windshield removal. CW operation is avoided because it results in damage to the windshield interlayer thus destroying the windshield, a result which is not desirable if an attempt is being made to recover undamaged windshields from wrecked automobiles. Applicant's light beam has to be focused to a specific line width of 16 mm by <1 mm of consistent power density at the distance of the ceramic layer in order to provide a practical system.

What is claimed is:

1. A method of removing a windshield from a frame of an automobiles said method comprising the steps of directing light output from an array of laser diodes at a ceramic layer present on an inside face of said windshield about a periphery thereof and conforming to said frame, maintaining said light output at a wavelength absorbed by said ceramic layer, and moving said light output along a path of said ceramic layer for a time and at a rate of travel to carbonize an adhesive layer between said ceramic layer and said frame.

2. A method of claim 1 including the step of focusing said light output at said ceramic layer.

3. A method of removing a windshield from a frame of an automobile, said windshield including on a frame-facing surface thereof a ceramic layer conforming to said frame and secured thereto by an adhesive layer, said method comprising the steps of directing light output from a laser source at said ceramic layer, maintaining said light output at a wavelength absorbed by said ceramic layer, and moving said light output along a path of said ceramic layer for a time and at a rate of travel to carbonize said adhesive layer.

4. A method as in claim 3 including the step of focusing said light output to a line width of sixteen mm by less than one mm of consistent power density at said ceramic layer.

5. A method as in claim 4 wherein said laser source comprises a linear diode array and said step of focusing comprises focusing the light output from said diode array.

6. A method as in claim 5 wherein said laser source comprises first and second laser diode arrays spaced apart from one another along said path and said step of focusing comprises focusing each of said arrays.

* * * * *